United States Patent [19]
Shore

[11] 3,713,603
[45] Jan. 30, 1973

[54] RETRACTABLE MEASURING TAPE
[75] Inventor: Sidney X. Shore, Roslyn, N.Y.
[73] Assignee: Souvenir Pen and Pencil Company, Cedar Rapids, Iowa
[22] Filed: Nov. 30, 1971
[21] Appl. No.: 203,159

[52] U.S. Cl. ................................242/107.2, 33/138
[51] Int. Cl. ..........................B65h 75/48, G01b 3/10
[58] Field of Search..242/107.2, 107.3, 107.6, 107.1, 242/107 R; 33/137 R, 138

[56] References Cited
UNITED STATES PATENTS

| R14,409 | 12/1917 | Saxton | 33/137 R |
|---|---|---|---|
| 2,016,483 | 10/1935 | Carlson | 242/107.2 |
| 2,269,534 | 1/1942 | Jaeger | 242/107.2 |
| 2,469,679 | 5/1949 | Witchger | 242/107.3 |

*Primary Examiner*—Stanley N. Gilreath
*Assistant Examiner*—Jon W. Henry
*Attorney*—Paul S. Martin

[57] ABSTRACT

A measuring tape with a wind-up spring is equipped with an arresting device that can be used to prevent automatic wind-up. No moving parts are involved. The user can readily adjust the extended length of tape without releasing the arresting device.

7 Claims, 5 Drawing Figures

PATENTED JAN 30 1973 3,713,603

RETRACTABLE MEASURING TAPE

The present invention relates to measuring tapes.

It has long been common to provide measuring tapes with a container and a wind-up spring. The user is handicapped in the use of such retractable measuring tapes because the tape remains extended for use only so long as the user holds the end of the tape and the container, requiring use of both hands. Many locking devices have been proposed for enabling the user to pull out a desired length of tape and lock the wind-up device or the tape itself, to free the user's hands without "losing" the extended measuring tape. Such devices have been prone to disorder, they add a significant proportion of cost, and they usually require manipulation by the user before the length of measuring tape that extends from the container can be adjusted.

An object of the present invention resides in providing a novel retractable measuring tape with a novel device available to the user for arresting the tape against automatic wind-up. More particularly, an object of the invention resides in providing an automatically retractable measuring tape with a retraction-arresting device avoiding the above-mentioned limitations and disadvantages.

An illustrative embodiment of the invention is shown in the accompanying drawings and described in detail below. That embodiment has a container and a wind-up spring, and a resilient measuring tape attached to the spring extends through an opening in the case. The resilient tape tends to project in a given direction from the container. A stationary device on the container provides a passage to admit an extended portion of the measuring tape laterally. A gradual bend forms in the resilient tape between the stationary device and the container opening. The arrangement develops friction to arrest the measuring tape with any desired projecting length. That length can be manually adjusted directly and without manipulating a locking device. The tape is retracted automatically when the extended portion of the tape is shifted out of the passage of the arresting device.

The nature of the invention and its further novel features, objects and advantages will be more fully appreciated from the following detailed description and the drawings.

Figure 1:
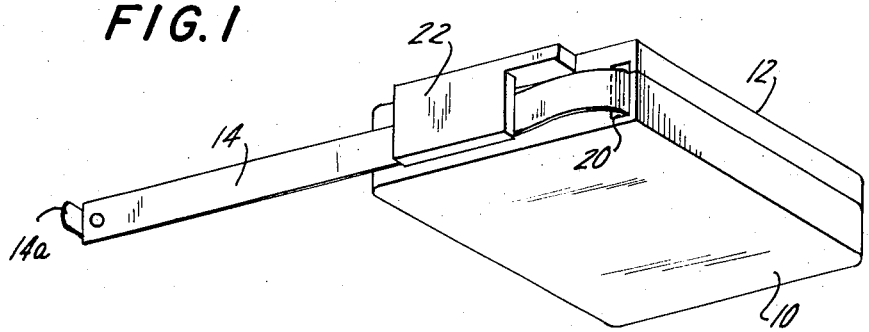
FIG. 1 is a perspective view of an illustrative embodiment of the invention having a measuring tape in its arrested position.

The retractable measuring tape in the drawings includes a container conveniently made of two parts 10 and 12 of molded plastic, joined together as a unit. Measuring tape 14 is shown partly withdrawn from the container, showing scale divisions and numbers. Most of tape 14 is shown wound inside container 10, 12. The innermost end of tape 14 is riveted or otherwise secured to the outermost end of a wind-up coil spring whose innermost end 16a is sharply bent for retention in slotted post 18 integral with container part 10.

Figure 3:
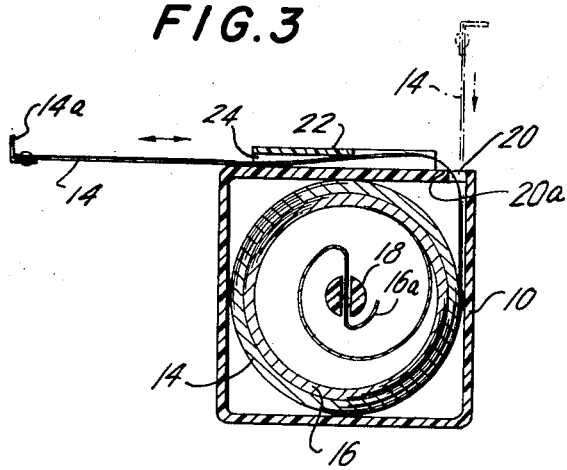
FIG. 3 is a cross-section of the embodiment of FIGS. 1 and 2 as viewed from the plane 3—3 in FIG. 2 and including a broken-line representation of a portion of the tape in its unarrested position.
Figure 5:
FIG. 5 is an enlarged cross-section of the measuring tape as seen at the plane 5–5 of FIG. 2.

As seen in dotted lines in FIG. 3, a portion of the tape 14 can be pulled manually so as to extend from opening 20 in the position represented in broken lines. When the tape is in that position, as soon as it is released it is freely retracted into the container by spring 16. Hook 14a limits the wind-up and later can be grasped to pull the tape out for use. As seen in FIG. 5, the tape is curved transversely when it is extended from the container, serving to stiffen and straighten the extended part of the tape. The usual measuring tapes of this kind are of resilient sheet metal. When wound inside the container, the convolutions of the tape are not transversely curved.

The automatic wind-up feature of the tape is a great convenience, and such automatically retracted tapes are popular. However it takes two hands to use such a tape, one hand to hold the container and the other to hold the extended portion of the tape so as to arrest it against being wound up.

A stationary device 22 extending integrally from container part 14 enables the person using the tape to arrest the tape against automatic wind-up. Device 22 is spaced from the container to provide a passage 24 that is open laterally, i.e., to receive tape 14 laterally. Device 22 is spaced from opening 20 so that a moderate bend can form in the tape between the device and the opening, avoiding a sharp bend that would deform the tape permanently.

Device 22 is evidently off-set from the normal (broken-line) position of the tape emerging from the container, in order for the described bend to be formed when the tape is inserted into passage 24. Sufficient friction develops at various points to arrest tape 14 against being wound into the container. Much of this friction develops between the tape and corner 20a, but the friction between the tape and other portions of the container and the device 22 contribute to the arresting effect.

Figure 4:
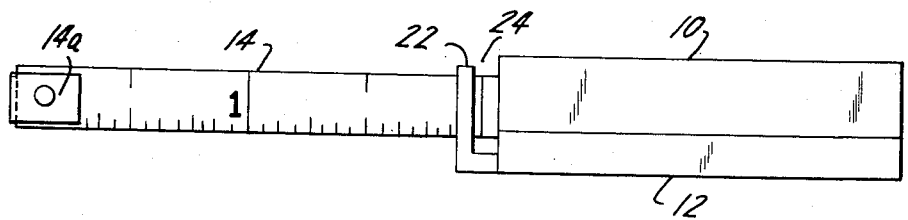
FIG. 4 is a side view of the embodiment of FIGS. 1–3 as seen from the left of FIG. 3 and with the measuring tape in its unarrested position.

It has already been noted that tape 14 is curved transversely when the tape is extended. Passage 24 is at least wide enough (as viewed in FIGS. 3 and 4) so that the tape in the passage retains its transverse curvature. Thus, the tape has stiffness along the extended length, up to the region of the gradual bend approaching the opening 20. There the transverse curvature ends.

There is no need to release and then engage any locking device when the user wants to have more or less of the measuring tape extending from the container. The described friction that arrests the tape does not represent a positive lock. The user can readily adjust the length of measuring tape that projects, simply by pulling or pushing the part of the tape that projects beyond device 22.

Figure 2:
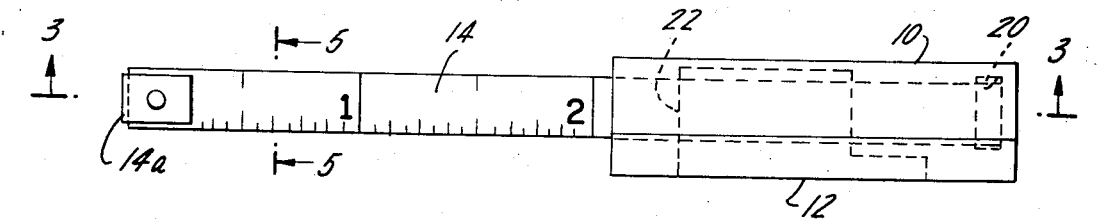
FIG. 2 is a side view of the embodiment of FIG. 1.

Device 22 is flat in the form shown. This contributes to the utility of the measuring tape. The user can grasp container 10, 12 and place device 22 against the surface to be measured by the extended length of the tape. In situations where that surface is horizontal as on a table, the measuring tape can be put in place and it rests there. In that sense it is as convenient to use as a simple non-adjustable ruler. The scale markings are exposed to view (FIG. 2) when device 22 rests on the surface being measured.

Device 22 is a stationary element that is formed as an integral portion of the container, virtually at no cost. It involves no moving parts and there is nothing that can go out of order. To utilize the tape-arresting feature, it is unnecessary for the user to grasp or manipulate anything other than the container and the tape itself. The projecting length of tape is readily adjustable without need to engage and release a tape lock found in other retractable measuring tapes. The extended length of tape tends to be straight, largely as a result of its transverse curvature (FIG. 5) and the direction that the tape extends from the container is established by the elongated passage 24 formed by container 10, 12 and device 22.

Various modifications could be made in the foregoing presently preferred embodiment of the invention. Thus, it is an advantage to have passage 24 generously wide, so that the tape is not gripped in the passage. The passage could be made tighter or even tight enough to flatten tape 14. That tightness would be effective to arrest the tape, but a tight passage would be more difficult to use and is unnecessary. Further it has been indicated that the tape-arresting friction develops in the illustrated form of construction partly in passage 24, partly in the opening 20 and some inside the container itself. It would be possible to cause some or virtually all of the tape-arresting friction to develop in passage 24. This could be the result of a tight passage mentioned above. Alternatively the passage itself could impose a friction-developing bend in the tape. In that case, little or no bend would be needed at opening 20, i.e., there would be no need for the right-angular offset (as illustrated in FIG. 3) between the arrested and freely retracted positions of the tape. However, the preferred form of construction has been shown, and it has distinctive practical advantages, in that it is compact and simple to make and to use.

Various other modifications can be made in the illustrative embodiment by those skilled in the art within the broad scope of the invention. Consequently, the invention should be construed broadly in accordance with its true spirit and scope.

What is claimed is:

1. A retractable measuring tape, including a container, a coiled wind-up spring in the container, a resilient measuring tape having one end secured to the wind-up spring and biased by the spring to be wound as a coil inside the container and said measuring tape extending through an opening in the container and having an external manually engageable part for withdrawing any desired portion of the measuring tape from the container for use, and a stationary device on the container providing a laterally open passage in which the tape may be inserted for forcing the tape to assume a suitably contoured bend to arrest the tape frictionally against being rewound by the spring.

2. A retractable measuring tape in accordance with claim 1, wherein said resilient measuring tape is normally curved transversely and wherein said passage is at least wide enough to receive said tape in its transversely curved state.

3. A retractable measuring tape in accordance with claim 1, wherein said stationary device is disposed on the container at a location that causes said bend to be formed between said opening and said device.

4. A retractable measuring tape in accordance with claim 1, wherein a portion of said resilient measuring tape emerging normally from said opening inherently tends to assume a position in which the tape is freely rewound into the container, said device being off-set from the normally emerging position of the measuring tape so that, when an externally extending portion of said tape near the opening is inserted into said passage, said bend develops in the tape between said device and said opening.

5. A retractable measuring tape in accordance with claim 4, wherein said passage is elongated for causing the portion of the tape extending beyond said device to assume a stable direction.

6. A retractable measuring tape in accordance with claim 4, wherein said resilient measuring tape is normally curved transversely, said laterally open passage being at least wide enough to receive a portion of the tape in its transversely curved condition, said stationary device being spaced from the opening so that said bend forms as a moderate lengthwise curve wherein the tape is not curved transversely.

7. A retractable measuring tape in accordance with claim 1, wherein said device has a flat surface remote from said container on which the container can reSt, and wherein the measuring tape has scale markings at the side thereof that is exposed when the container rests on said flat surface.

* * * * *